(12) United States Patent
Luu et al.

(10) Patent No.: US 10,802,130 B2
(45) Date of Patent: Oct. 13, 2020

(54) MARINE TARGET DETECTION IN CLUTTERED ENVIRONMENTS

(71) Applicant: VIETTEL GROUP, Ha Noi (VN)

(72) Inventors: Hoai Nam Luu, Ha Noi (VN); Vu Hop Tran, Ha Noi (VN); Xuan Hoang Dong, Ha Noi (VN); Duc Duong Nguyen, Ha Noi (VN); Trung Duc Le, Ha Noi (VN)

(73) Assignee: VIETTEL GROUP, Ha Noi (VN)

( * ) Notice: Subject to any disclaimer, the term of this patent is extended or adjusted under 35 U.S.C. 154(b) by 111 days.

(21) Appl. No.: 16/198,967

(22) Filed: Nov. 23, 2018

(65) Prior Publication Data

US 2019/0162838 A1    May 30, 2019

(30) Foreign Application Priority Data

Nov. 28, 2017  (VN) .............................. 1-2017-04786

(51) Int. Cl.
*G01S 13/524* (2006.01)
*G01S 7/41* (2006.01)

(52) U.S. Cl.
CPC .......... *G01S 13/5244* (2013.01); *G01S 7/414* (2013.01); *G01S 13/5246* (2013.01); *G01S 13/5248* (2013.01)

(58) Field of Classification Search
CPC .... G01S 7/414; G01S 13/0209; G01S 13/426; G01S 13/5244; G01S 13/5246; G01S 13/56; G01S 13/88; G01S 7/415; G01F 1/663; G01F 16/285
See application file for complete search history.

(56) References Cited

U.S. PATENT DOCUMENTS

| | | | | |
|---|---|---|---|---|
| 5,781,149 A | * | 7/1998 | Long | G01S 13/5246 342/159 |
| 6,771,209 B1 | * | 8/2004 | Long | G01S 7/2921 342/93 |
| 6,940,448 B2 | * | 9/2005 | Knoop | B60W 30/095 342/70 |
| 10,514,454 B1 | * | 12/2019 | Parrott | G01S 7/415 |
| 2010/0073218 A1 | * | 3/2010 | Stockmann | G01S 7/2923 342/146 |
| 2011/0267219 A1 | * | 11/2011 | Kisliansky | G01S 7/414 342/90 |

* cited by examiner

Primary Examiner — Olumide Ajibade Akonai
(74) Attorney, Agent, or Firm — Patenttm.us

(57) ABSTRACT

Method of slowly moving target detection with application for coastal surveillance radars. This method improves the well know other methods and efficiently detects targets with a high accuracy. The proposed method consists of three steps that are: step of generation and processing of signals with complex modulation; step of target clustering and step of detection of slowly moving targets in clutter environments.

6 Claims, 6 Drawing Sheets

MARINE TARGET DETECTION IN CLUTTERED ENVIRONMENTS

FIELD OF THE INVENTION

This invention relates to radar detection of a slowly moving surface target in the presence of clutter. This is an overall synchronous solution containing design wide band signal, adaptive CFAR and Modern automatic clutter map.

STATUS TECHNICAL OF INVENTION

Currently, most of X-Band Coastal Surveillance Radar systems use Magnetron Power Amplifier because of lower price, high power and small size. Disadvantages of this solution are only using simple pulse and non-coherence pulse train. So range resolution of the system is low and it is difficult to detection a small target, slowly moving target in clutter.

So the invention launches a new solution to solve the disadvantage of old system and improve the radar detection capabilities for slowly moving targets in clutter.

BACKGROUND OF INVENTION

This invention proposes method detection for slowly moving target applicable to Coastal Surveillance Radar to solve disadvantages of old systems and improve detection performance, effectiveness and exactness.

This disclosure contains three processing step: step 1: Generate and Process Complex Modulation Signal; step 2: Cluster Target by doppler evidence; step 3: detection of slowly moving target in noise.

In this invention, we replace Magnetron Power Amplifier with Solid State Power Amplifier (SSPA). This technology enables using wideband modulation pulse with high range solution after Pulse Compression output (normally solution less than 3 metre). With high solution, we can easily classify reflex signals from target or noise. Additionally, when using SSPA module we can use doppler processing to get doppler shift of signal and radial velocity of target. After doppler processing, we will categorize targets into two group: fastly moving target and slowly moving target in noise.

Fastly moving targets will be processed by automatic detection radar using a Constant False Alarm Ration (CFAR). Slowly moving targets will be processed by 3 independent blocks: Detection by OS-CFAR 3 Dimension, detection by noise distribution statistics; detection by clutter map over periods.

DETAILED DESCRIPTION OF THE INVENTION

Figure 1:
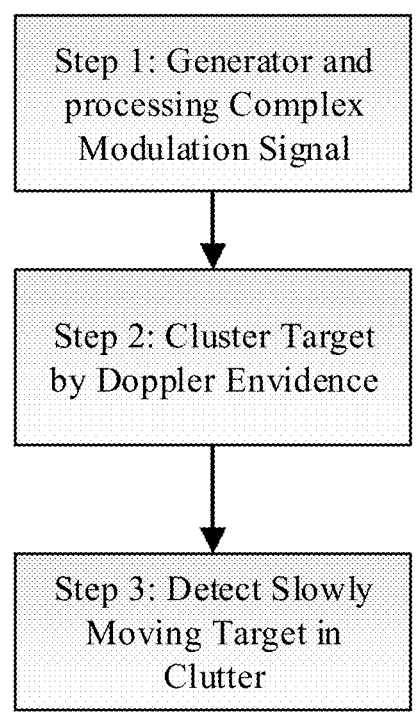
FIG. 1: is a block diagram that illustrates steps of processing.
Figure 2:
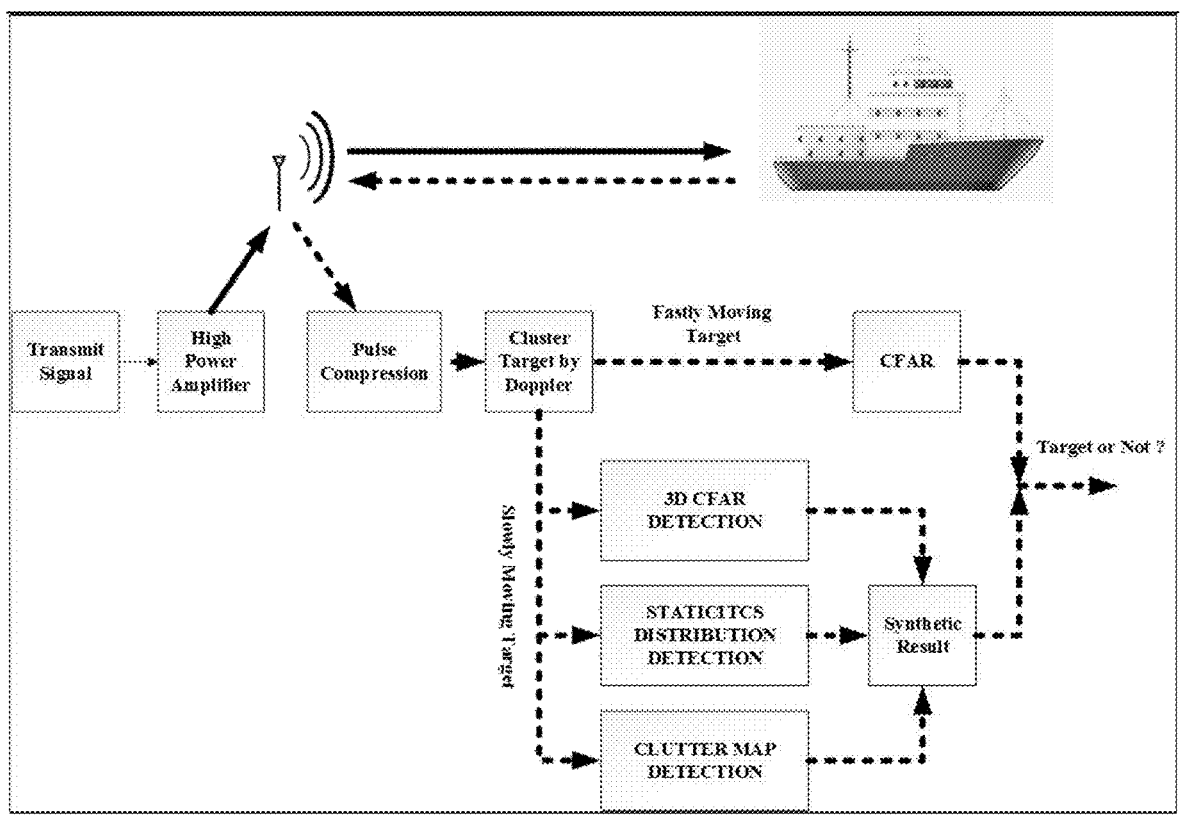
FIG. 2: is a block diagram that illustrates method of detection of slowly moving target.
Figure 3:
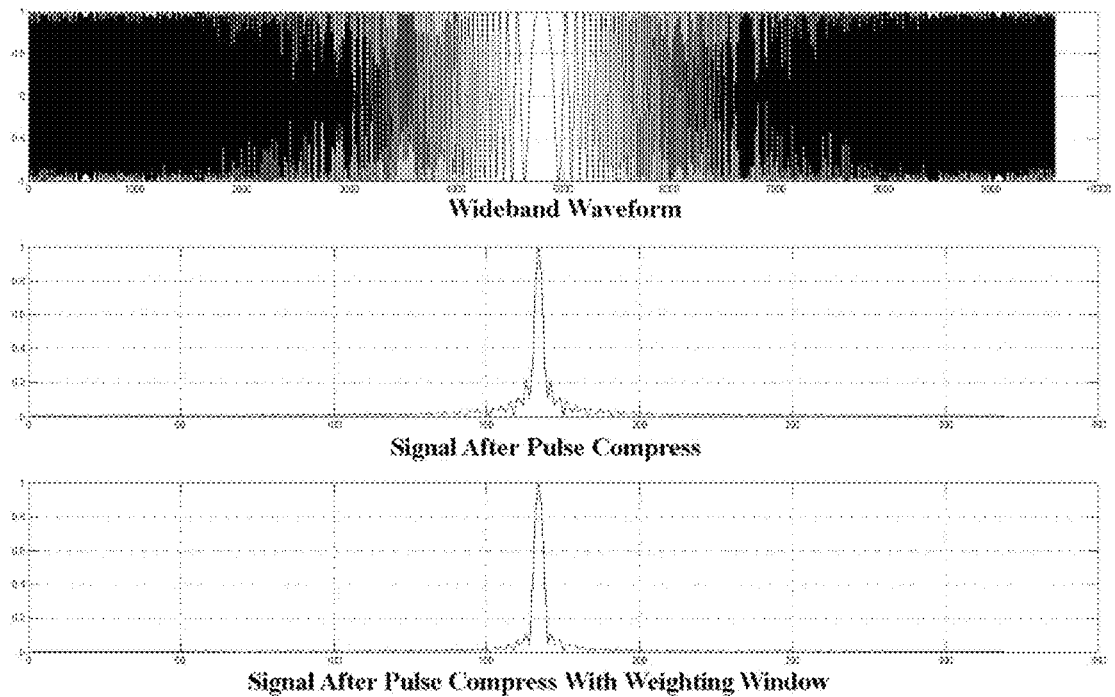
FIG. 3: is a diagram that illustrates result of compression pulse.
Figure 4:
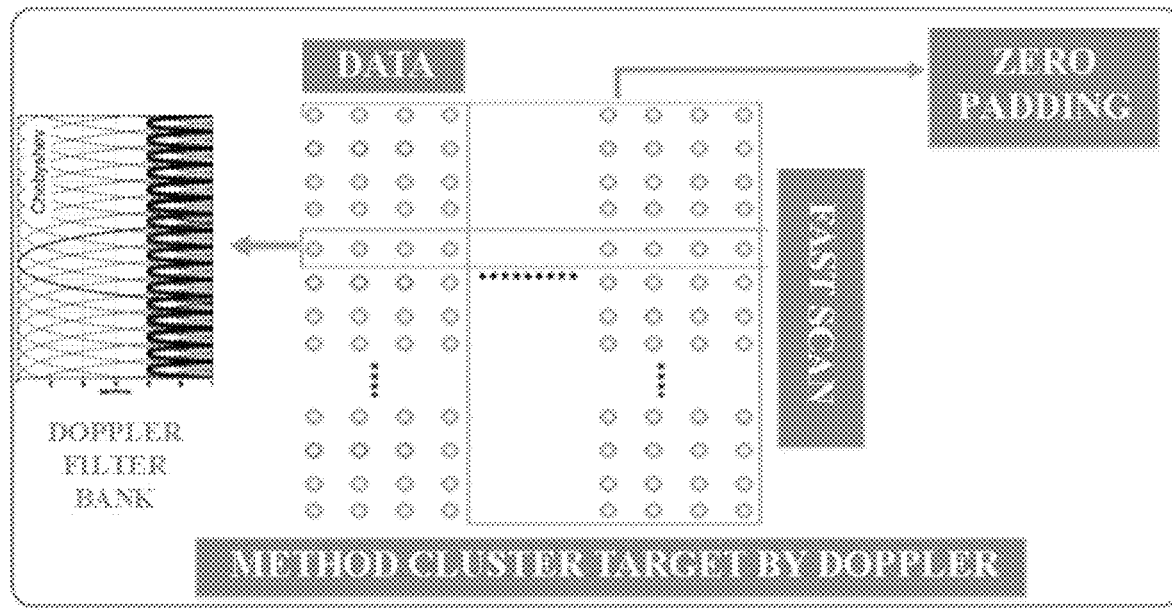
FIG. 4: is a diagram that illustrates method of cluster target according to velocity.
Figure 5:
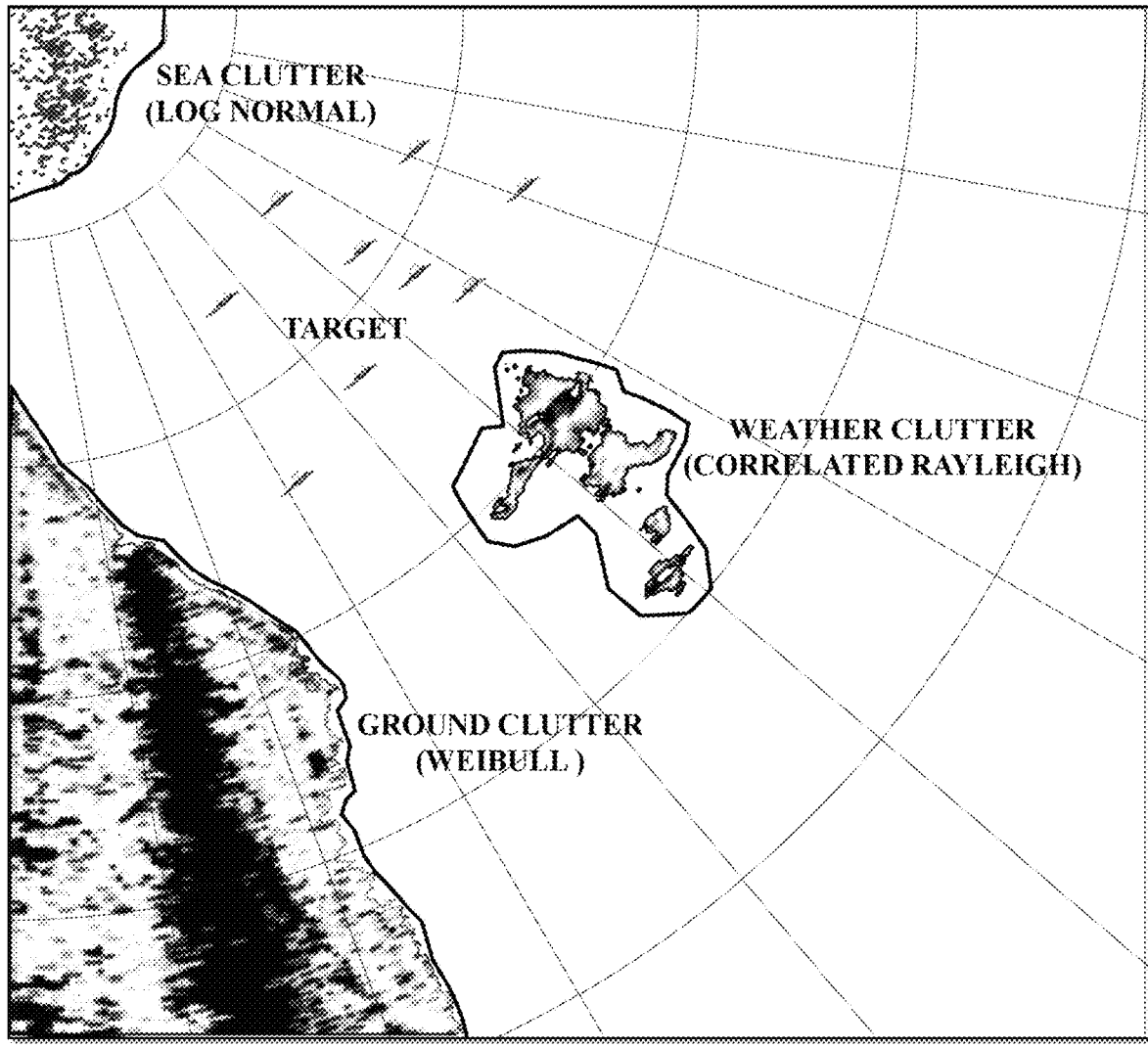
FIG. 5: is a diagram that illustrates results of noise distribution statistics.
Figure 6:
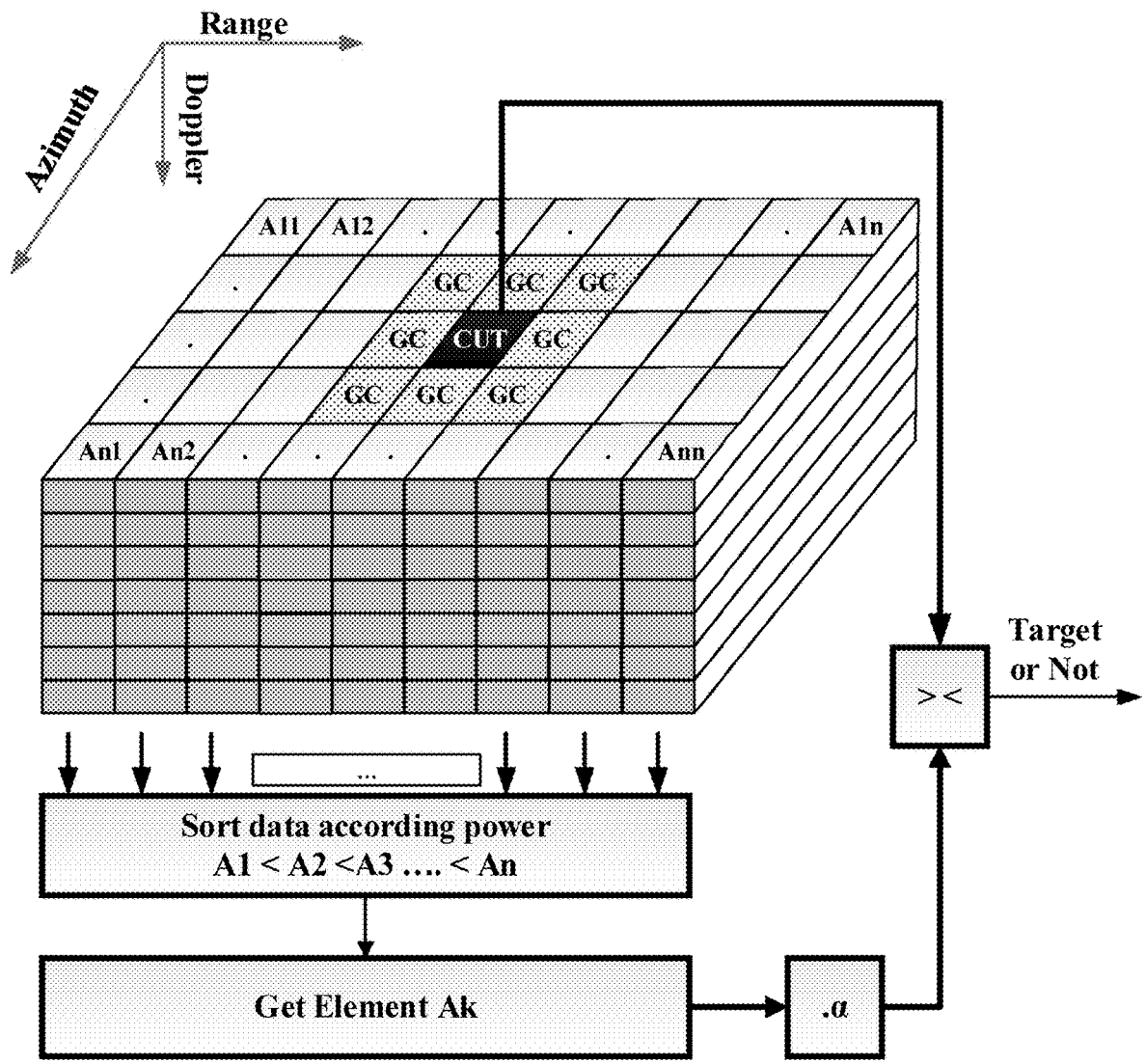
FIG. 6: is a diagram that illustrates method target detection by 3D-CFAR Algorithm.
Figure 7:
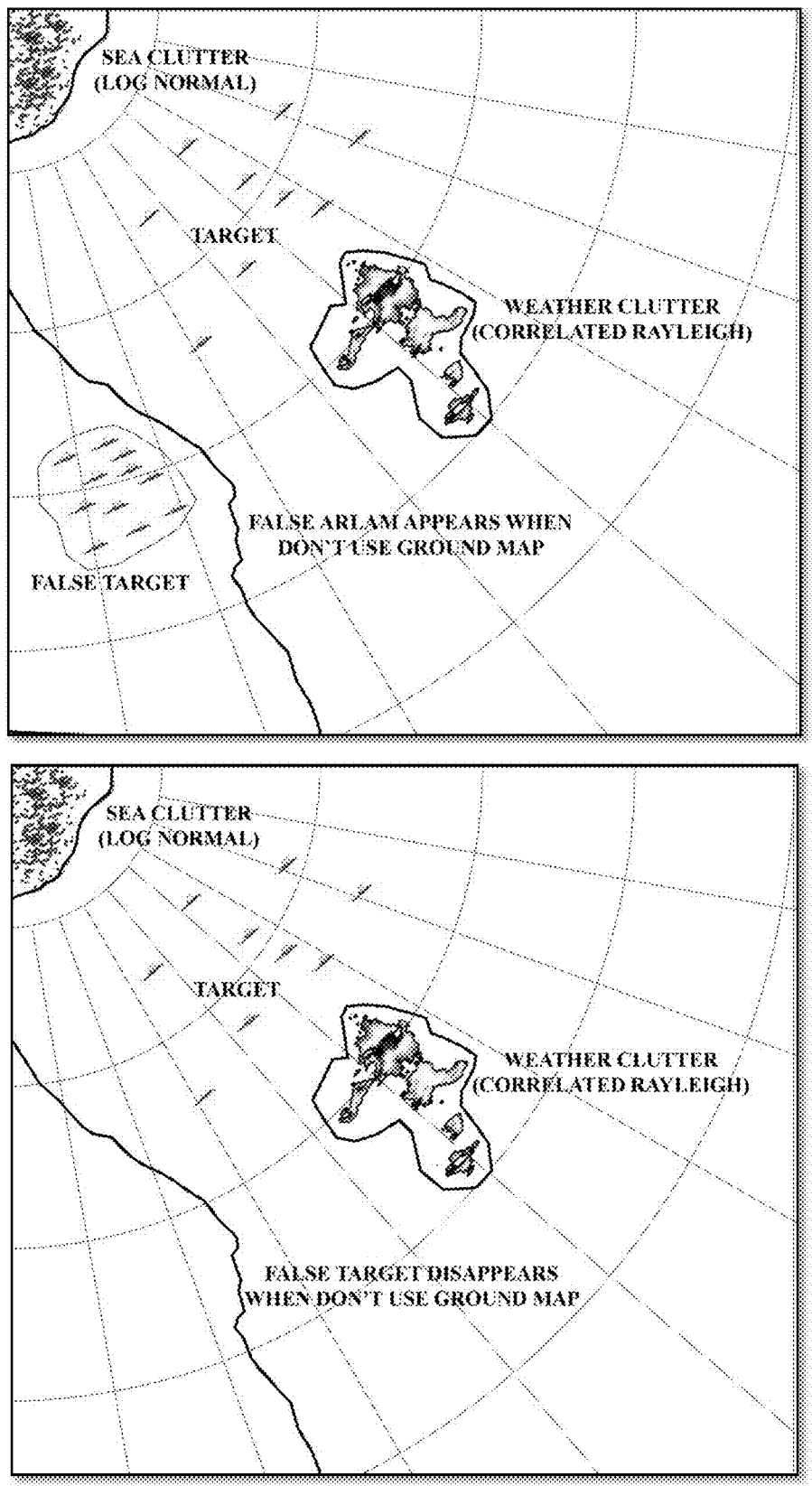
FIG. 7: is a diagram that illustrates result target detection by clutter map.

Method of detection of slowly moving targets contain 3 processing steps:

Step 1: Generate and Process Wideband Modulation Signal

We make a wideband modulate of the signal such that the range resolution after pulse compression is 2.5 m and the compression ratio Kn=35 dB.

One of the wideband modulation that is usually used in the radar system is the linear frequency modulation (LFM):

$$S(t) = e^{j2\pi(f_0 t + \frac{\mu}{2}t^2)} \quad (1.1)$$

where:
t is the time;
$f_0$ is the frequency of carrier wave;
$\mu$ is the LFM coefficient.
The pulse compression output at receiver is:

$$S(t,f_d) = \int_{-\infty}^{+\infty} s(t')S^*(t'-t)e^{j2\pi f_d t'} dt' \quad (1.2)$$

where:
t is the time delay;
$f_d$ is the doppler frequency;
t' is the time variable of echo signal.

Since the modulated signal has a low peak side-lobe ratio, we proposed a compression method by using Nuttal weighted window. This method improved the peak side-lobe ratio and its result is expressed by:

$$S(t,f_d) = W(t)^* \int_{-\infty}^{+\infty} s(t')S^*(t'-t)e^{j2\pi f_d t'} dt' \quad (1.3)$$

where:
W (t) is the Nuttal weighted window.

The advantage of using wideband signal will be detailing reflex signal between small target (fishing boat having width about 2-5 m) and sea clutter. Disadvantage of using wideband modulation signal is large computing. Therefore we suggest using structure of high performance computing containing:

The structure by combining FPGA and DDS synthesizer at the signal generator.

The GPU with high performance computing (approximately 5 TFLOPS) for pulse compression and digital processing.

Moreover, to guarantee that the system is fully synchronized and phase coherent, we used a system clock of 10 Mhz which has a very small error (0.01 ppm).

To do this step, blocks used are a block of signal generator with wideband modulation and high resolution; a block of coherent signal generator with complex generator; a block of pulse compression with weighted window.

Step 2: Target Clustering

Doppler effect happens when a target is moving with reference to the radar station and the Doppler shift in frequency is directly proportional to radial velocity of targets.

We use the moving target detector (MTD) to cluster all targets into 2 groups by their velocities. The first group consists of all slowly moving targets and the other group consists of fast moving targets. Since the clutters (weather, sea, land, . . . ) are included in the group of slowly moving targets, so in the next step we need to recognize slow moving targets and clutters in the first group.

To do this step, we propose using the following blocks: a block of coherent intergration; a block of select doppler filter banks.

Step 3: Detect Slowly Moving Targets in Clutter Environments.

To detect targets in clutter environments we will use together three independent detectors. The outputs of these detectors are then combined to perform the final result.

First detector: 3D OS-CFAR (3 Dimensional Ordered Statistical Constant False Alarm Rate). The powers of echo signals are arranged into a cube in three dimensional space (range, azimuth, doppler). For each cell under test (CUT) in this cube, all powers in the reference cells are arranged as an increased sequence, and then the optimal threshold is estimated. This method has a better performance in comparison with 1D CFAR.

Second detector based on the clutter distributions. All power values of the radar echo signals in the considered area are fitted by a distribution. The test of goodness-of-fit is done by using chi-square test. For example, sea clutter has a lognormal distribution; weather clutter is followed by Rayleigh distribution while ground clutter has a Weibull distribution. From the clutter distribution and probability of false alarm (Pfa) we obtain the threshold for target detection by threshold=$F^{-1}$(1–$Pfa$), where F is the cumulative distribution function for clutters and $F^{-1}$ is the inverse function of F.

Third detection is based on clutter map. The clutter map is performed automatically using digital filtering. The target's echo signals are compared with this map to classify exactly these echo signals (from clutters or from real targets).

By the disclosed systems and methods improved radar detection capabilities for slowly moving targets in clutter is provided.

What is claimed is:

1. A method of detecting a slowly moving radar target in clutter environments comprising the steps of:
    Step 1: generate and process signal with complex modulation, wherein in this step, a signal with complex modulation, high range resolution and high compression ratio is generated and processed;
    Step 2: target clustering, wherein in this step, all targets are clustered by their radial velocities to 2 groups comprising slowly moving targets and fast moving targets; and
    Step 3: slowly moving target detection by using together three detectors that are a 3D Ordered Statistical Constant False Alarm Rate (OS-CFAR) detector, a detector based on statistical analysis of clutter distributions and a detector based on a clutter map.

2. The method of detecting a slowly moving radar target in clutter environments according to claim 1, in which
    Step 1: generate and process signal with complex modulation consists of the following: a block of signal generator with complex modulation and high resolution; a block of coherent signal generator with complex generator; and a block of pulse compression with weighted window.

3. The method of detecting a slowly moving radar target in clutter environments according to claim 1, in which
    Step 2: target clustering comprises using the following blocks: a block of coherent intergration; and a block of doppler bank filters.

4. The method of detecting a slowly moving radar target in clutter environments according to claim 1, in which
    Step 3: Detect slowly moving targets in clutter environments comprising using together three independent detectors,
    First detector: 3D OS-CFAR (3 Dimensional Ordered Statistical Constant False Alarm Rate), where the powers of echo signals are arranged into a cube in three dimensional space representing range, azimuth, doppler), for each cell under test (CUT) in this cube, all powers in the reference cells are arranged as an increased sequence, and then the optimal threshold is estimated, This method has a better performance in comparison with 1D CFAR;
    Second detector based on the clutter distributions, by applying statistical techniques the distributions of clutters is obtained, for example, sea clutter has a lognormal distribution; weather clutter is followed by Rayleigh distribution while ground clutter has a Weibull distribution, from the probability of false alarm (Pfa) a threshold for target detection is obtained; and
    Third detection is based on clutter map, the clutter map is performed automatically using digital filtering, the target's echo signals are compared with this map to classify exactly these echo signals as being from clutters or from real targets.

5. The method of detecting a slowly moving radar target in clutter environments according to claim 1, in which
    The use of semiconductor amplifier technology solid state (amplifier by using of semiconductor transistors) to generate the explorer signal with complex modulation, high range resolution of below 3 meters after processing, in the result, reflected signals are easily classified from true targets or from clutters.

6. The method of detecting a slowly moving radar target in clutter environments according to claim 1, in which
    semiconductor amplifier technology is used to allow coherent processing, in the result target doppler shifts and target radial velocities can be obtained, hence, all targets can be combined into two groups that are the group of fast moving targets and the group of slowly moving targets in clutter environments.

* * * * *